(12) United States Patent
Wang et al.

(10) Patent No.: US 11,318,843 B2
(45) Date of Patent: May 3, 2022

(54) ELECTRIC CAR, ACTIVE DISCHARGING MODULE, DRIVING APPARATUS AND ELECTRIC DRIVE SYSTEM THEREOF

(71) Applicant: NIO CO., LTD., Shanghai (CN)

(72) Inventors: Yinshan Wang, Shanghai (CN); Wencheng Hong, Shanghai (CN); Zhaohui Zhuang, Shanghai (CN); Liwen Xu, Shanghai (CN)

(73) Assignee: NIO CO., LTD., Shanghai (CN)

( * ) Notice: Subject to any disclaimer, the term of this patent is extended or adjusted under 35 U.S.C. 154(b) by 904 days.

(21) Appl. No.: 15/955,886

(22) Filed: Apr. 18, 2018

(65) Prior Publication Data

US 2018/0297478 A1   Oct. 18, 2018

(30) Foreign Application Priority Data

Apr. 18, 2017   (CN) .......................... 201710253284.9

(51) Int. Cl.
| | |
|---|---|
| B60L 3/00 | (2019.01) |
| H02J 7/14 | (2006.01) |
| B60L 53/20 | (2019.01) |
| B60L 3/04 | (2006.01) |
| H02J 7/00 | (2006.01) |

(52) U.S. Cl.
CPC .............. B60L 3/0069 (2013.01); B60L 3/04 (2013.01); B60L 53/20 (2019.02); H02J 7/14 (2013.01); H02J 7/0029 (2013.01); H02J 2007/0067 (2013.01); *Y02T 10/70* (2013.01); *Y02T 10/72* (2013.01)

(58) Field of Classification Search
CPC .... H02J 7/14; H02J 7/0029; H02J 2007/0067; H02J 2310/48; B60L 3/04; B60L 3/20; B60L 3/0069; B60L 53/20; B60L 53/00; B60L 15/20

See application file for complete search history.

(56) References Cited

U.S. PATENT DOCUMENTS

| | | | | |
|---|---|---|---|---|
| 2013/0207619 A1* | 8/2013 | Viancino | ............... | H03K 17/163 |
| | | | | 320/166 |
| 2016/0276854 A1* | 9/2016 | Lian | ...................... | H02J 7/0024 |

* cited by examiner

*Primary Examiner* — David V Henze-Gongola
(74) *Attorney, Agent, or Firm* — Sheridan Ross P.C.

(57) ABSTRACT

The present application relates to an electric car and an active discharging module, a driving apparatus, and an electric drive system thereof. said active discharging module comprises a discharging subcircuit, which is connected in parallel with the DC-link capacitor of the electric car, and a first switch, which is connected to an actuating apparatus of the electric car and the discharging subcircuit respectively. The discharging subcircuit comprises a discharging resistor and a power switching transistor which are connected in series, wherein the first switch may turn off the power switching transistor after the actuating apparatus is turned on, and turn on the power switching transistor after the actuating apparatus is turned off. Said driving apparatus comprises any one of the above active discharging modules. Said electric drive system comprises any one of the above driving apparatuses. Said electric car comprises any one of the above electric drive system.

19 Claims, 2 Drawing Sheets

ELECTRIC CAR, ACTIVE DISCHARGING MODULE, DRIVING APPARATUS AND ELECTRIC DRIVE SYSTEM THEREOF

CROSS-REFERENCE TO RELATED APPLICATION

This application claims the benefit of China Patent Application No. 201710253284.9 filed Apr. 18, 2017, the entire contents of which are incorporated herein by reference in its entirety.

TECHNICAL FIELD

The present application relates to the technical field of electric motor control for electric cars, and more particularly, to an electric car and an active discharging module, a driving apparatus, and an electric drive system thereof.

BACKGROUND

Generally, a DC-link capacitor, which is used for current limiting or buffering, is disposed in the DC intermediate link, DC-link, between a rectifier and an inverter in an electric car. When an electric car is under normal operation, there may be a certain amount of power stored in the DC-link capacitor. In order to enhance personal safety of an electric car driver or a maintenance crew, it is required to quickly release the power stored in the DC-link capacitor to less than a secure power level after the electric car has been turned off and stopped operating.

At present, a discharging module, which is used for discharging the DC-link capacitor, and a control module, which is used for controlling this discharging module, may be disposed inside an electric car, wherein after the electric car has been turned off and stopped operating, the discharge module may be controlled by this control module to discharge the DC-link capacitor and release the stored power to less than a secure power level. However, when the control module or its power supply module malfunctions, it may be too late or even fail to control the discharge module to discharge the DC-link capacitor, which increases potential safety risks of an electric car driver or a maintenance crew.

SUMMARY

In order to address the above issues in the prior art, i.e. in order to solve the technical problem of the discharging module failing to discharge the DC-link capacitor in the case of power failure or its control module malfunctioning, the present application provides an active discharging module, a driving apparatus and an electric drive system which includes the driving apparatus of an electric car. In addition, the present application provides an electric car which is provided with the above electric drive system.

In the first aspect, a technical solution for an active discharging module of an electric car in the present application is:

Said active discharging module comprising:

A discharging subcircuit, which is connected in parallel with a DC-link capacitor of said electric car; said discharging subcircuit including a discharging resistor and a power switching transistor which are connected in series; said discharging resistor being used for absorbing the discharging current released via said discharging subcircuit from said DC-link capacitor; said power switching transistor being used for implementing the turn-on and turn-off of said discharging subcircuit;

A first switch, which is connected to an actuating apparatus of said electric car and said power switching transistor respectively; said first switch being used for implementing the turn-off of said power switching transistor after said actuating apparatus has been turned on, as well as implementing the turn-on of said power switching transistor after said actuating apparatus has been turned off.

Further, a preferred technical solution provided by the application is:

Said power switching transistor comprising an NMOS-type power switching transistor, a drain of which being connected to said discharging resistor, a source of which being connected to a cathode of said DC-link capacitor, and a gate of which being connected to said first switch;

Wherein a terminal of said discharging resistor is connected to an anode of said DC-link capacitor, and the other terminal is connected to the drain of said power switching transistor; wherein the anode of said DC-link capacitor is connected to a positive voltage terminal of the DC bus (i.e. a DC bus voltage anode), and the cathode of said DC-link capacitor is connected to a negative voltage terminal of the DC bus (i.e. a DC bus voltage cathode).

Further, a preferred technical solution provided by the application is:

Said first switch comprising an NPN-type digital triode;

Wherein a collector of said NPN-type digital triode is connected to the anode of said DC-link capacitor and said power switching transistor respectively;

An emitter of said NPN-type digital triode is connected to a negative voltage terminal of the DC bus; and A gate of said NPN-type digital triode is connected to said actuating apparatus.

Further, a preferred technical solution provided by the application is:

Said active discharging module further comprising a triggering subcircuit which is used for triggering the turn-on of said power switching transistor; said triggering subcircuit comprising a voltage divider resistor and a voltage stabilizer which are connected in series;

A terminal of said voltage divider resistor being connected to the anode of said DC-link capacitor, the other terminal being connected to a cathode of said voltage stabilizer and the collector of said NPN-type digital triode respectively; and An anode of said voltage stabilizer being connected to the negative voltage terminal of said DC bus.

Further, a preferred technical solution provided by the application is:

Said triggering subcircuit comprising one voltage divider resistor or a plurality of voltage divider resistors connected in series.

Further, a preferred technical solution provided by the application is: said discharging subcircuit further comprising a first connector;

Wherein said first connector comprises a plurality of terminals in series: one of said terminals is connected to said discharging resistor, one of said terminals is connected to said power switching transistor, and one of said terminals is connected to the anode of said DC-link capacitor.

In the second aspect, a technical solution for a driving apparatus of an electric car is:

Said driving apparatus comprising a power converting module and said active discharging module described in any one of the above technical solutions; said active discharging module being connected in between the positive voltage terminal and the negative voltage terminal of the DC bus of said power converting module;

Wherein said discharging subcircuit in said active discharging module is connected in parallel with a DC-link capacitor of said power converting module;

Said first switch in said active discharging module is connected to an actuating apparatus of said power converting module.

Further, a preferred technical solution provided by the application is:

Said driving apparatus further comprising a second switch;

Said second switch, one terminal of which is connected to the positive voltage terminal of said DC bus, the other terminal of which is connected to the anode of said DC-link capacitor, being used for implementing the turn-on and turn-off between said DC-link capacitor and the positive voltage terminal of said DC bus; wherein the cathode of said DC-link capacitor being connected to the negative voltage terminal of said DC bus.

Further, a preferred technical solution provided by the application is:

Said second switch in said driving apparatus comprising a contactor.

In the third aspect, a technical solution for an electric drive system of an electric car is:

Said electric drive system comprising an electric control apparatus, an electric motor, a transmission apparatus and said driving apparatus in any one of the above technical solutions;

Said power converting module in said driving apparatus, which is connected to said electric control apparatus and said electric motor respectively, being used for receiving a power output instruction sent by said electric control apparatus, and driving said electric motor to put the transmission apparatus in action; wherein said transmission apparatus drives the action of a mechanical component of said electric car;

The first switch of said active discharging module in said driving apparatus being connected to said electric control apparatus.

In the fourth aspect, a technical solution for an electric car of the application is:

Said electric car comprising a power battery, a power battery output interface, and said electric drive system of any one of the above technical solutions;

The power converting module of said driving apparatus in said electric drive system, which is connected to said power battery output interface, being used for performing power conversion for a DC source output by said power battery.

Comparing with the prior art, the above technical solutions have at least the following beneficial effects:

1. An active discharging module of an electric car provided by the application comprises a discharging subcircuit and a first switch, and said discharging subcircuit is connected in parallel with a DC-link capacitor of the electric car, and the turn-on of the discharging subcircuit may be implemented with the first switch after an actuating apparatus of the electric car is turned off, which implements discharging the DC-link capacitor, without disposing an independent control module, as well as automatically discharging the DC-link capacitor in the case of the actuating apparatus losing power, guaranteeing the personal safety of an electric car driver and a maintenance crew;

2. A driving apparatus of an electric car provided by the application, which comprises said active discharging module of any one of the above technical solutions, may automatically discharge the DC-link capacitor of the power converting module in the driving apparatus in the case of the driving apparatus malfunctioning, guaranteeing the personal safety of an electric car driver and a maintenance crew;

3. An electric drive system of an electric car provided by the application, which comprises said driving apparatus of any one of the above technical solutions, may automatically discharge the DC-link capacitor of the power converting module in the driving apparatus in the case of the electric drive system or the driving apparatus malfunctioning, guaranteeing the personal safety of an electric car driver and a maintenance crew;

4. An electric car provided by the application, which comprises said electric drive system of any one of the above technical solutions, may automatically discharge the DC-link capacitor of the power converting module in the driving apparatus in the case of the electric car, the electric drive system or the driving apparatus malfunctioning, guaranteeing the personal safety of an electric car driver and a maintenance crew.

Figure 1:
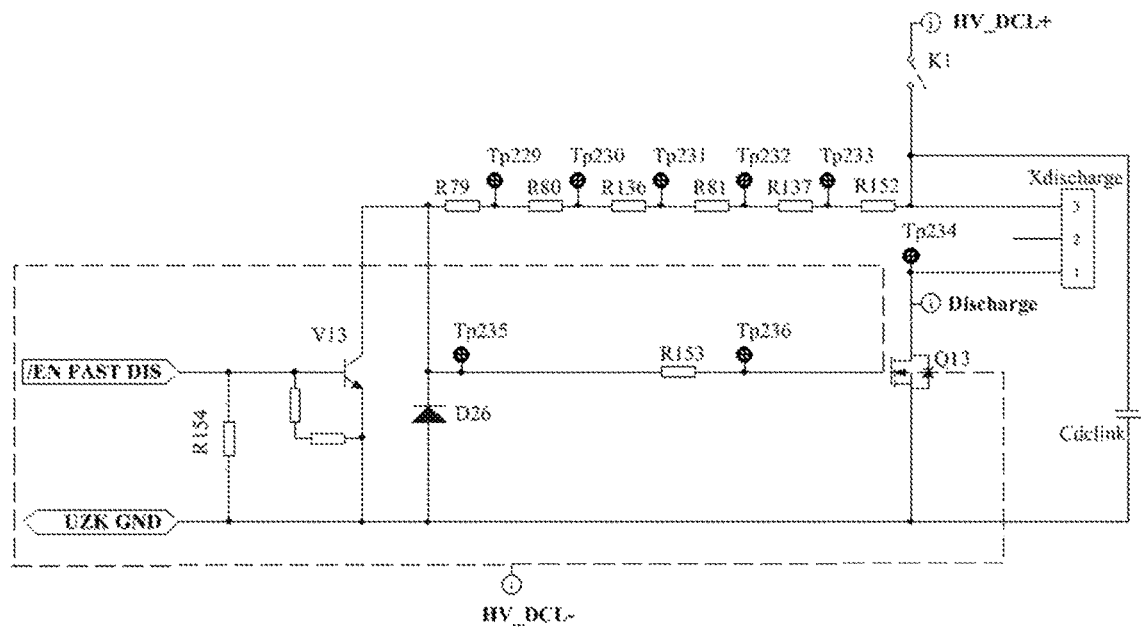
FIG. 1 is a schematic circuit diagram of an active discharging module of an electric car in an embodiment of the application.

Wherein 11 represents a voltage curve of a DC-link capacitor; 12 represents a curve of turn-on drive signal of a triode; 21 represents a voltage curve of a DC-link capacitor; and 22 represents a curve of turn-on drive signal of a triode

DESCRIPTION OF EMBODIMENTS

The preferred embodiments of the application are described in reference with the accompanying drawings below. It should be understood by those skilled in the art that these embodiments are merely used for explaining the technical principles of the application, rather than intending to limit the scope of protection of the application.

After an electric car is started, a DC-link capacitor in its power converting module will be charged via a DC bus of the power converting module. After the electric car has been turned off and stopped operating, the power stored in the DC-link capacitor is required to be released to less than a safe power level, so as to guarantee the personal safety of an electric car driver or a maintenance crew. To this end, the application provides an active discharging module of an electric car, which may automatically discharge the DC-link capacitor after the electric car is turned off, without disposing an independent control module, and may also automatically discharge the DC-link capacitor even in a state of power failure.

An active discharging module of an electric car in an embodiment of the application is specifically described in conjunction with the accompanying drawings below.

The active discharging module of an electric car in this embodiment may comprise a discharging subcircuit and a first switch.

The discharging subcircuit is connected in parallel with the DC-link capacitor of the electric car, and may discharge the DC-link capacitor. The discharging subcircuit of this embodiment may comprise a discharging resistor and a power switching transistor which are connected in series, wherein the discharging resistor may be used for absorbing the discharging current released via the discharging subcircuit from the DC-link capacitor, and the power switching transistor may be used for implementing the turn-on or turn-off of the discharging subcircuit. When the power switching transistor in this embodiment turns on, the discharging resistor may absorb the discharging current output from the DC-link capacitor.

The first switch is connected to an actuating apparatus of the electric car and the power switching transistor respectively. The first switch in this embodiment may be used for implementing the turn-off of the power switching transistor after the actuating apparatus has been turned on, and for implementing the turn-on of the power switching transistor after the actuating apparatus has been turned off. Specifically, when the actuating apparatus has been turned on, it may provide a turn-on signal to the first switch, and the first switch turns on; when the actuating apparatus has been turned off, it no longer provides the turn-on signal to the first switch, and the first switch turns off. By implementing the turn-off of the power switching transistor when the first switch turns on, the DC-link capacitor is enabled to be charged via the DC bus, guaranteeing the electric car to operate normally; By implementing the turn-on of the power switching transistor when the first switch turns off, the DC-link capacitor is enabled to be discharged via the discharging subcircuit.

The actuating apparatus of the electric car in this embodiment may be an actuating apparatus of a device that includes the above DC-link capacitor in the electric car, for example, the actuating apparatus may be an actuating apparatus of a rectifier. The DC bus refers to a DC bus of a DC intermediate link of an electrical equipment in an electric car, for example, the DC bus may be a DC bus between a rectifier and an inverter.

The DC-link capacitor in this embodiment refers to a DC-link capacitor of a DC intermediate link of an electrical equipment in an electric car. For example, the DC-link capacitor may be a DC-link capacitor in a DC bus disposed in a power converting module of an electric car, one terminal of which may be connected to a positive voltage terminal HV DC+ of a DC bus, the other terminal of which may be connected to a negative voltage terminal HV DC− of a DC bus or to a UZK GND, wherein the power converting module may include a device such as a rectifier and/or an inverter, etc. The discharging subcircuit in this embodiment is connected in parallel with the DC-link capacitor, therefore when the discharging subcircuit is turned on, the DC-link capacitor may be discharged via the discharging subcircuit, and when the discharging subcircuit is turned off, the DC-link capacitor may be charged via the DC bus, enabling the power switching module to operate normally.

In this embodiment, the charging and discharging operation of the DC-link capacitor may be accomplished by using the original actuating apparatus of the electric car, without disposing a control module, in the case of the turn-on and turn-off of a discharging subcircuit may be controlled by the first switch. After the actuating apparatus is turned off, the first switch losses power and is automatically turned off, enabling the discharging subcircuit to be turned on, and implementing the automatic discharge for the DC-link capacitor. Moreover, in the case of the actuating apparatus losing power, the first switch also loses power and is automatically turned off, enabling the discharging subcircuit to be turned on, and implementing the automatic discharge for the DC-link capacitor.

Preferably, a preferred technical solution for a discharging subcircuit is provided by an embodiment of the application.

In this embodiment, the power switching transistor may comprise an NMOS-type power switching transistor, the drain of which is connected to the discharging resistor, the source of which is connected to the cathode of the DC-link capacitor, and the gate of which is connected to the first switch. Moreover, one terminal of the discharging resistor is connected to the anode of the DC-link capacitor, and the other terminal is connected to the drain of the power switching transistor.

In this embodiment, an NMOS-type power switching transistor is adopted for the turn-on and turn-off of the discharging subcircuit, and when the source-drain voltage of the NMOS-type power switching transistor is greater than a preset value, the NMOS-type power switching transistor is turned on. Therefore, in this embodiment, the NMOS-type power switching transistor is enabled to be turned off by reducing the source-drain voltage of the NMOS-type power switching transistor to 0 or a ground potential when the first switch is turned on, and the NMOS-type power switching transistor is enabled to be turned on by improving the source-drain voltage of the NMOS-type power switching transistor to a preset voltage when the first switch is turned off.

Further, in this embodiment, the first switch may comprise a triode, which may be connected to the actuating apparatus of the electric car and the power switching transistor respectively. The triode in this embodiment may turn off the power switching transistor after the actuating apparatus is turned on; and turn on the power switching transistor after the actuating apparatus is turned off. Specifically, an NPN-type digital triode may be adopted in this embodiment, the connection relationship of which are:

The collector of the NPN-type digital triode is connected to the positive voltage terminal of the DC bus and the power switching transistor respectively; the emitter of the NPN-type digital triode is connected to the negative voltage terminal of the DC bus; the gate of the NPN-type digital triode is connected to the actuating apparatus.

In this embodiment, after the actuating apparatus is turned on, a turn-on drive signal is output to the gate of the NPN-type digital triode, and the NPN-type digital triode is turned on, so that the gate voltage of the NMOS-type power switching transistor may be maintained at the voltage level of the negative voltage terminal of DC bus, which is the ground voltage in this embodiment, accordingly the NMOS-type power switching transistor may be blocked, the discharging subcircuit may be turned off, and the DC-link capacitor may be charged via the DC bus.

In this embodiment, after the actuating apparatus is turned off, the turn-on drive signal is no longer output to the gate of the NPN-type digital triode, the NPN-type digital triode is disconnected, and the gate voltage of the NMOS-type power switching transistor is no longer to be maintained at the voltage level of the negative voltage terminal of DC bus. It is can be known from the description above that the collector of the NPN-type digital triode is connected to the anode of the DC-link capacitor and the gate of the NMOS-type power switching transistor respectively, so that the gate of the NMOS-type power switching transistor may collect the voltage signal output from the positive voltage terminal of the DC bus or the anode of the DC-link capacitor, and be turned on when driven by this voltage signal.

Moreover, it is learnt from the description above that, in this embodiment, the actuating apparatus of the electric car may be an actuating apparatus of a device in an electric car which comprises the above DC-link capacitor, for example, the actuating apparatus may be an actuating apparatus of a rectifier. As a result, when the actuating apparatus is turned on, the positive voltage terminal of the DC bus is in a connection state with the anode of the DC-link capacitor, and may charge it; when the actuating apparatus is turned off, the positive voltage terminal of the DC bus is in a disconnection state with the anode of the DC-link capacitor, and may no longer charge it. In this embodiment, the power released from the DC-link capacitor after the actuating apparatus is turned off may be utilized to drive the NMOS power switching transistor to be turned on, then the discharging subcircuit is turned on, and the automatic discharge for the DC-link capacitor is implemented after the actuating apparatus is turned off.

Further, in this embodiment, the active discharging module further comprises the following structures, specifically:

In this embodiment, the active discharging module further comprises a triggering subcircuit, which may be used for triggering the turn-on of the power switching transistor. From the descriptions above, after the NPN-type digital triode is disconnected, the gate of the NMOS-type power switching transistor may collect the voltage signal output from the anode of the DC-link capacitor, and be turned on when driven by this voltage signal. However, the voltage value output from the anode of the DC-link capacitor is far greater than the drive voltage value that may be accepted by the NMOS-type power switching transistor, therefore, in this embodiment, the voltage signal output from the anode of the DC-link capacitor is converted into a drive voltage signal that may be used by the NMOS-type power switching transistor, by disposing a triggering subcircuit.

Specifically speaking, in this embodiment, the triggering subcircuit may comprise a voltage divider resistor and a voltage stabilizer which are connected in series, wherein a terminal of the voltage divider resistor being connected to the anode of the DC-link capacitor, the other terminal being connected to a cathode of the voltage stabilizer and a collector of the NPN-type digital triode respectively; and an anode of the voltage stabilizer is connected to the negative voltage terminal of the DC bus. In this embodiment, the voltage output from the anode of the DC-link capacitor is divided by the voltage divider resistor, and the voltage signal posterior to the voltage dividing is stabilized within a preset range by the voltage stabilizer, and finally a drive voltage signal that may be used by the NMOS-type power switching transistor is obtained.

Further, in this embodiment, the triggering subcircuit may comprises one voltage divider resistor, or a plurality of voltage divider resistors in series, each resistance value of which may be set in accordance with a preset triggering voltage of the NMOS-type power switching transistor. For example, when the turn-on condition of the NMOS-type power switching transistor is that the voltage between the gate and the source is not less than 10V, the triggering voltage of the NMOS-type power switching transistor may be set to 12V, and then a triggering voltage of 12V is obtained by further setting the resistance value of each voltage divider resistor.

In this embodiment, when the triggering subcircuit comprises a plurality of voltage divider resistors in series, one terminal of the series connection subcircuit formed by the plurality of voltage divider resistors is connected to the anode of the DC-link capacitor, and the other terminal is connected to the cathode of the voltage stabilizer.

Further, in this embodiment, the discharging subcircuit may further comprise a first connector with a plurality of terminals in series, wherein one of the terminals is connected to the discharging resistor, one of the terminals is connected to the power switching transistor, and one of the terminals is connected to the anode of the DC-link capacitor respectively, for respectively implementing the connection of the discharging resistor with the power switching transistor, the voltage divider resistor, and the anode of the DC-link capacitor. In this embodiment, the first connector is adopted to connect to the discharging resistor, in order to facilitate the installation or replacement of the discharging resistors with varied resistance values.

FIG. 1 exemplarily shows the circuit principle of an active discharging module of an electric car in this embodiment. As showed in the figure, the discharging subcircuit in this embodiment comprises a connector X discharge, a pin 1 of which is connected to an NMOS power switching transistor Q13, a pin 2 of which may be connected to a discharging resistor, and a pin 3 of which is connected to a triggering subcircuit. After the NMOS-type power switching transistor Q13 is turned on, it may form a series connection subcircuit with the discharging resistor, enabling the DC-link capacitor Cdclink to be discharged via this series connection subcircuit.

Wherein the triggering subcircuit may comprise a resistor R79, a resistor R80, a resistor R136, a resistor R81, a resistor R137 and a resistor R152, as well as a voltage stabilizer D26, which are connected in series. The other terminal of the resistor R170 is connected to the cathode of the voltage stabilizer D26, the other terminal of the resistor R152 is connected to the anode of the DC-link capacitor Cdclink and the pin 3 of Xdischarge respectively, and the anode of voltage stabilizer D26 is connected to the source of the NMOS-type power switching transistor Q13.

Wherein, the voltage stabilizer D26 is a BZX8412V voltage stabilizer, whose maximum stabilizing voltage is 12V. The voltage of the anode of DC-link capacitor Cdclink may be collected by the triggering subcircuit in this embodiment, and after divided by the resistor R79, the resistor R80, the resistor R136, the resistor R81, the resistor R137, and the resistor R152, as well as the voltage stabilizer D26, it is further output to the gate of the NMOS power switching transistor Q13 via the resistor R153. The actual value of the triggering voltage output to the gate of the NMOS-type power switching transistor may be measured through a testing point Tp236.

As shown in FIG. 1, the collector of the NPN-type digital triode V13 in this embodiment is connected in between the voltage divider resistor R79 and the cathode of the voltage stabilizer D26, the emitter is connected to the anode of the voltage stabilizer D26, and the gate may be connected to the actuating apparatus of the electric car, an turn-on drive signal "EN FAST DIS" may be output to said actuating apparatus after the actuating apparatus is turned on, enabling the turn-on of the NPN-type digital triode V13.

The operating process of the active discharging module when the electric car is turned on or off in this embodiment is explained in conjunction with the drawings below, and may specifically comprise:

The circuit structure of the active discharging module in this embodiment is shown as FIG. 1, specifically: all of the resistor R79, the resistor R80, the resistor R136, the resistor R81, the resistor R137, and the resistor R152 in the triggering subcircuit adopt a resistor with a resistance value of 100 kΩ and a precision of 0.1%, and the resistance value of the resistor R153 is 51Ω.

1. The Process of Starting an Electric Car

Figure 2:
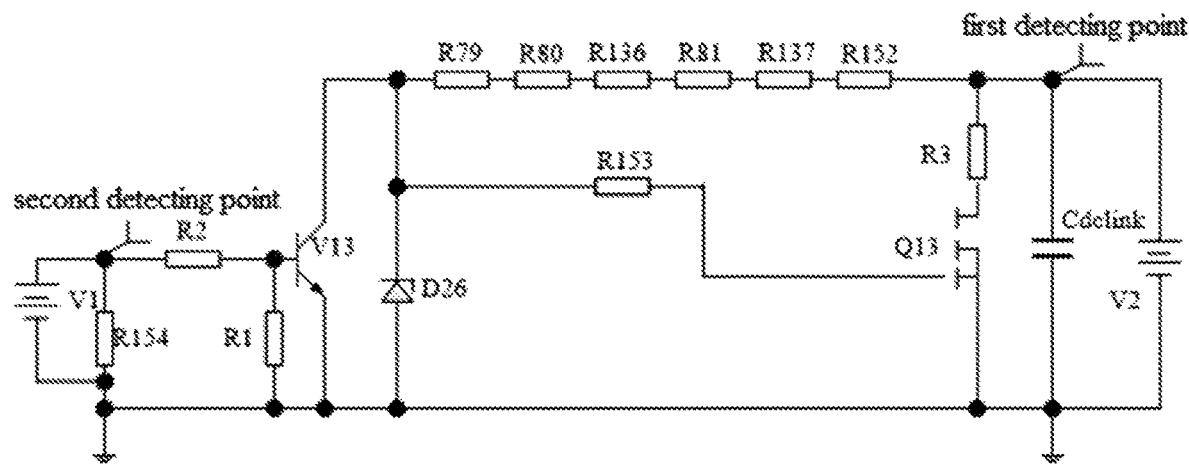
FIG. 2 is a simulation circuit diagram of an active discharging module of an electric car in an embodiment of the application.

FIG. 2 exemplarily shows a simulation circuit of an active discharging module in the process of starting an electric car in this embodiment. As shown in the figure, the resistance value of the discharging resistance R3 in the discharging subcircuit in this embodiment is 350Ω, and the resistance value of both resistors of the NPN-type digital triode V13 are 4.7 kΩ.

When the electric car is started, its actuating apparatus is turned on, in the circuit shown in FIG. 1, the accessing switch K1 of the DC-link capacitor Cdclink is closed, while a turn-on drive signal V1 is output to the gate of the NPN-type digital triode V13 from the actuating apparatus. The turn-on drive signal V1 in this embodiment is a voltage signal of 5V. When the NPN-type digital triode is turned on, the gate voltage of the NMOS-type power switching transistor Q13 is a ground potential, and therefore the NMOS-type power switching transistor is blocked, the discharging resistor R3 is disconnected with the negative voltage terminal of the DC bus or the cathode of the DC-link capacitor, enabling the DC-link capacitor to be charged via the DC bus.

Figure 3:
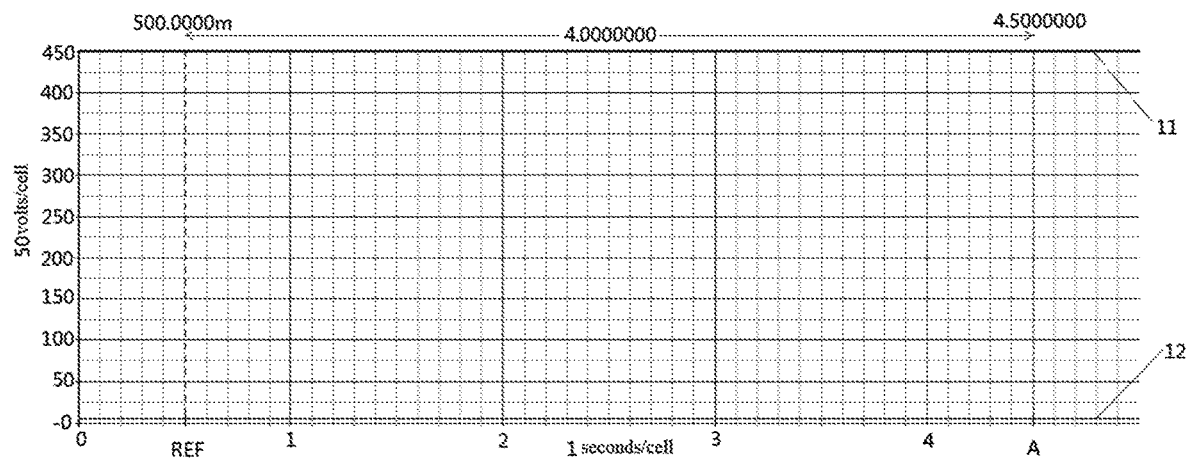
FIG. 3 is a simulation oscillogram of an active discharging module of an electric car in an embodiment of the application.

FIG. 3 exemplarily shows a simulation oscillogram of an active discharging module in the process of starting an electric car in this embodiment, wherein the unit of the horizontal axis of the simulation oscillogram is 1 second/cell, which represents that the time of each cell on the horizontal axis is 1 second, and the "1" on the horizontal axis represents the time corresponding to 10 cells, i.e., 10 seconds; the unit of the vertical axis of the simulation oscillogram is 50 volts/cell, which represents that the voltage of each cell on the horizontal axis is 50V. A curve 11 represents the capacitance voltage V2 of the DC-link capacitor, and a curve 12 represents the turn-on drive signal V1 of the NPN-type digital triode V13. As shown in FIGS. 2 and 3, after the electric car is started and normally operated, the actuating apparatus continuously output the turn-on drive signal V1 to the NPN-type digital triode V13, the capacitance voltage V2 of the DC-link capacitor Cdclink is maintained at a certain value, the capacitance voltage V2 may be measured as 450V via a first detecting point (Probe1-NODE) shown in FIG. 3, and the turn-on drive signal V1 of the NPN-type digital triode V13 may be measured as 5V via a second detecting point (Probe2-NODE).

In this embodiment, the turn-off of the discharging subcircuit may be implemented with the turn-on of the NPN-type digital triode V13, causing the normal operating of the DC-link capacitor not being affected when the electric car is started.

2. The Process of Stop Operating an Electric Car

Figure 4:
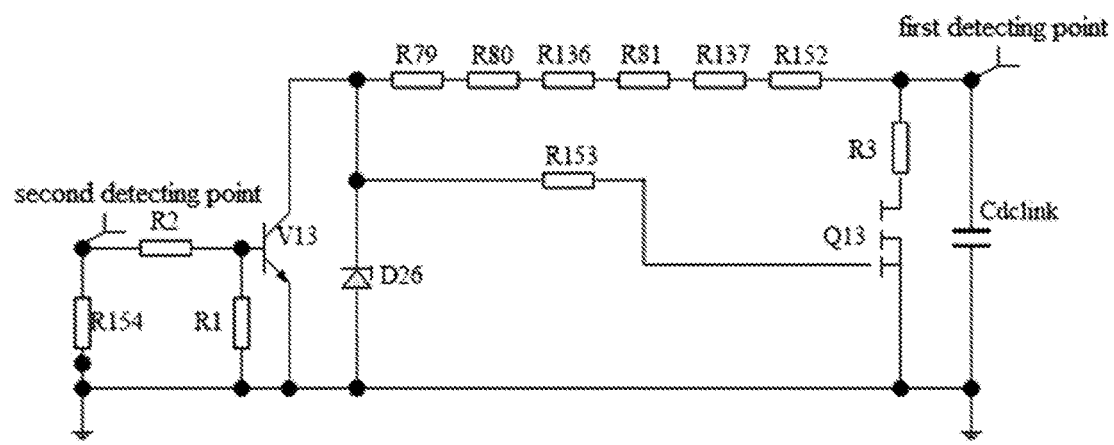
FIG. 4 is a simulation circuit diagram of another active discharging module of an electric car in an embodiment of the application.

FIG. 4 exemplarily shows a simulation circuit of an active discharging module in the process of stop operating an electric car in this embodiment. As shown in the figure, in this embodiment, the resistance value of the discharging resistor R3 in the discharging subcircuit is 350Ω, and the resistance value of both resistors of the NPN-type digital triode V13 are 4.7 kΩ.

When the electric car stops operating, its actuating apparatus is turned off, and the accessing switch K1 of the DC-link capacitor Cdclink in the circuit shown in FIG. 1 is disconnected, while an turn-on drive signal V2 is stopped to be output to the gate of the NPN-type digital triode V13 from the actuating apparatus, and the turn-on of the NPN-type digital triode V13 is disconnected. When the NPN-type digital triode V13 is disconnected, the voltage divider resistor R79, the resistor R80, the resistor R136, the resistor R81, the resistor R137, and the resistor R152 collect the anode voltage of the DC-link capacitor Cdclink, and divide this anode voltage together with the voltage stabilizer D26, the divided voltage is output to the gate of the NMOS-type power switching transistor Q13 via the resistor R153, enabling the NMOS-type power switching transistor Q13 to be turned on, and then the discharging resistor R3 is connected to the cathode of the DC-link capacitor Cdclink, which may be discharged via the discharging resistor R3.

Figure 5:
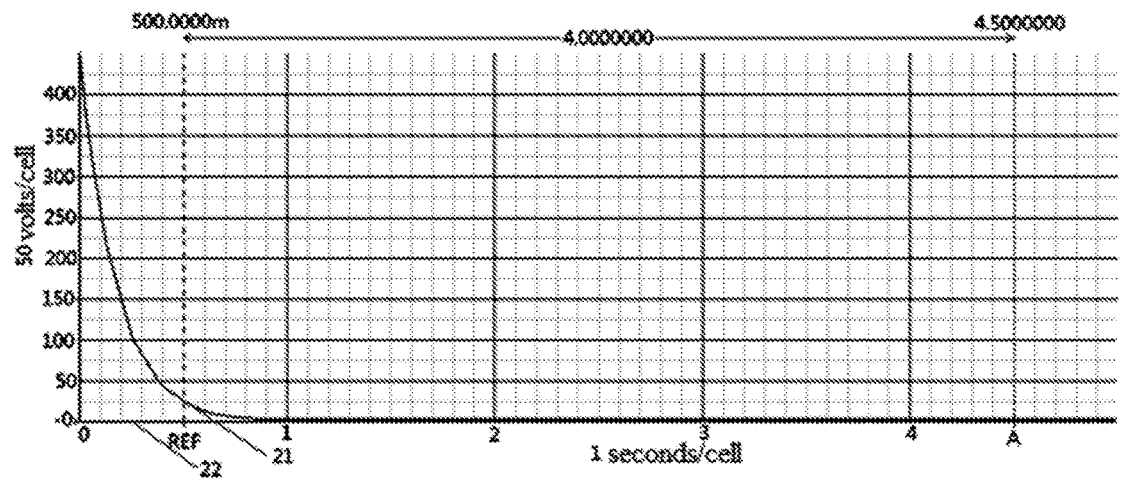
FIG. 5 is a simulation oscillogram of another active discharging module of an electric car in an embodiment of the application.

FIG. 5 exemplarily shows a simulation oscillogram of an active discharging module in the process of stopping operating an electric car in this embodiment, wherein the unit of the horizontal axis of the simulation oscillogram is 1 second/cell, which represents the time of each cell on the horizontal axis is 1 second, and the "1" on the horizontal axis represents a time corresponding to 10 cells, i.e., 10 seconds; the unit of the vertical axis of the simulation oscillogram is 50 volts/cell, representing the voltage amplitude of each cell on the vertical axis is 50V. A curve 21 is a capacitance voltage V2 of the DC-link capacitor, and a curve 22 is a turn-on drive signal V1 of the NPN digital triode V13. As shown in FIGS. 4 and 5, the turn-on drive signal V1 output from the NPN digital triode V13 may be measured as 0V after the electric car stop operating via a first detecting point (Probe1-NODE) as shown in FIG. 4; the capacitance voltage V2 of the DC-link capacitor Cdclink may be measured as rapidly dropping from 450V to approximately 0V after the electric car stop operating via a second detecting point (Probe2-NODE).

In this embodiment, the turn-on of the discharging subcircuit may be implemented with the turn-off of the NPN digital triode V13, enabling the implementation of discharging the DC-link capacitor without disposing an independent control module or in the case of the actuating apparatus losing power when the electric car stops operating.

An NMOS-type power switching transistor Q13 and an NPN-type digital triode V13 are adopted in this embodiment, and the turn-on of the NMOS-type power switching transistor Q13 may be triggered by utilizing the power stored in the DC-link capacitor Cdclink after the actuating apparatus of the electric car is turned off, then the discharging subcircuit is turned on, enabling the power stored in the DC-link capacitor Cdclink to be released via the discharging resistor R3 and reach a safe power level.

It may be understood by those skilled in the art that a self-adopting change may be made to the modules in the apparatus of this embodiment and they may be disposed in one or more apparatus that is different from this embodiment. The modules or units or components in the embodiments may be combined as a single module or unit or component, and furthermore, they may be divided into a plurality of submodules or subunits or subcomponents. In addition to at least some of such features and/or processes or units being mutually exclusive, any combination may be adopted to combine all of the features disclosed in the specification (including the accompanying claims, abstract, and drawings) and all of the processes and units of any methods or apparatuses disclosed as such. Unless otherwise stated explicitly, each feature disclosed in the specification (including the accompanying claims, abstract, and drawings) may be replaced by an alternating feature which provides the same, equal or similar objective.

Based on the above active discharging module of the electric car, an embodiment of the present application further provides a driving apparatus of an electric car, which is explained below specifically.

A driving apparatus of an electric car in this embodiment may comprise a power converting module and the active discharging module described in the above technical solutions, wherein the power converting module may be used for converting the output power of the power battery in the electric car, and the active discharging module is used for discharging the DC-link capacitor in the power converting module.

Further, the power converting module in this embodiment may comprise a second connector; the active discharging module may be connected in between the positive voltage terminal and the negative voltage terminal of the DC bus in the power converting module via this second connector, i.e., the DC-link capacitor in the power converting module may be discharged when the electric car stops operating. From the description above, the discharging subcircuit of the active discharging module in this embodiment is connected in between the positive voltage terminal of the DC bus and the negative voltage terminal of the DC bus.

Further, the driving apparatus in this embodiment may further comprise a second switch. One terminal of this second switch may be connected to the positive voltage terminal of the DC bus, the other terminal is connected to the anode of the DC-link capacitor, and the cathode of the DC-link capacitor is connected to the negative voltage terminal of the DC bus. In this embodiment, the second switch may be used for implementing the turn-on and turn-off between the DC-link capacitor and the positive voltage terminal of the DC bus, i.e., when the driving apparatus has been turned on, the DC bus may be enabled to charge the DC-link capacitor by controlling the second switch to be closed.

Preferably, the second switch in the embodiment may be a contactor.

In this embodiment, it is not required to dispose an independent control module for the driving apparatus, which is used for controlling the discharging for the DC-link capacitor in the power converting module after the driving apparatus is turned off, enhancing the personal safety of an electric car driver and a maintenance crew.

Based on the above active discharging module and the driving apparatus of the electric car, a embodiment of the present application further provides an electric drive system of an electric car. This electric drive system is specifically explained below.

The electric drive system of an electric car in this embodiment may comprise an electric control apparatus, an electric motor, a transmission apparatus, and the driving apparatus of any one of the above technical solutions, wherein the electric control apparatus may be used for controlling the driving apparatus on and off; the electric motor may rotate in accordance with the output power of the driving apparatus, and then drive the action of the transmission apparatus; the transmission apparatus may be used for driving the electric motor to put wheels of the electric car in action.

In this embodiment, the power converting module of the transmission apparatus may be connected to the electric control apparatus, used for receiving a power output instruction from the control apparatus, and conducted a power adjustment in accordance with the power output instruction. Moreover, the power converting module also may be connected to the electric motor, used for driving the electric motor to put the transmission apparatus in action.

The first switch of the driving apparatus in this embodiment may be connected to the electric control apparatus. When the electric control apparatus controls the driving apparatus to start while may control the first switch to be closed, the DC-link capacitor of the power converting module in the driving apparatus may be rendered to be charged via the DC bus; when the electric control apparatus controls the driving apparatus to be turned off while may control the first switch to be disconnected, the DC-link capacitor of the power converting module in the driving apparatus may be rendered to be automatically discharged via the active discharging module.

Based on the active discharging module, the driving apparatus and the electric drive system of an electric car described above, the embodiment of the application further provides an electric car, which is specifically explained below.

The electric car in this embodiment may comprise a power battery, an output interface of the power battery, and the electric drive system of any one of the above technical solutions, wherein the power battery may be used for providing power to the electric drive system.

In this embodiment, the power converting module of the driving apparatus of the electric drive system is connected to the output interface of the power battery, and may be used for implementing power conversion for the DC source output from the power battery.

In this embodiment, when the electric drive system controls the power battery to output power to the driving apparatus, the electric control apparatus of the electric drive system may control the driving apparatus to be started, as well as may control the first switch to be closed, enabling the DC-link capacitor of the power converting module in the driving apparatus to be charged via the DC bus; when the electric drive system controls the power battery to no longer output power to the driving apparatus, the electric control apparatus of the electric drive system controls the driving apparatus to be turned off, as well as may control the first switch to be disconnected, enabling the DC-link capacitor of the power converting module in the driving apparatus to be automatically discharged via the active discharging module.

Furthermore, it should be understood by those skilled in the art that, although some embodiments described herein comprise some of the features which is included in other embodiments rather than the other features, the combination of the features of various embodiments is meant to be in the scope of the application and form various embodiments. For example, in the following appendant claims, any one of the embodiments that is claimed to be protected may be used in any way of combination.

It should be noticed that the above embodiments are explanations of the application rather than a limitation to the application, and alternating embodiments may be designed by those skilled in the art without departing from the scope of the appendant claims. In the claims, any reference symbol located in between a pair of brackets should not construct a limitation on the claims. The word "comprise" does not exclude the elements or steps that is not listed in the claims. The word "a" or "one" in front of an element do not exclude a plurality of such elements. The present application may be implemented by means of embodying the hardware of a variety of elements and by means of an appropriately programmed PC. In the claims that cite a variety of apparatuses, some of these apparatuses may be implemented particularly with the same hardware item. The usage of word "first", "second", and "third" does not represent any particular order. These words may be interpreted as names.

Hereto, the technical scheme of the present application has been described in combination with the preferred embodiments shown in the accompanying drawings, however, it should be readily understood by those skilled in the art that the scope of protection of the application is apparently not limited to these particular embodiments. Equivalent modifications or alternations may be made by those skilled in the art without departing from the principle of the application, and the technical scheme after these modifications or alternations will fall within the scope of protection of the application.

What is claimed is:

1. An active discharging module of an electric car comprising a power converting module, wherein said active discharging module comprises:
 a discharging subcircuit, which is connected in parallel with a DC-link capacitor of said power converting module, said discharging subcircuit including a discharging resistor and a power switching transistor which are connected in series, said discharging resistor being used for absorbing a discharging current released via said discharging subcircuit from said DC-link capacitor, said power switching transistor being used for implementing turn-on and turn-off of said discharging subcircuit; and
 a first switch, which is connected to an actuating apparatus of said power converting module and said power switching transistor respectively, said first switch being adapted to be controlled by said actuating apparatus
 wherein said first switch turns on when it receives a turn-on signal from said actuating apparatus by means of turn-on of said actuating apparatus, and the turn-on of said first switch renders the turn-off of said power switching transistor, and
 wherein when said actuating apparatus loses power, said first switch turns off, and the turn-off of said first switch renders the turn-on of said power switching transistor for automatically discharging said DC-link capacitor.

2. The active discharging module of an electric car of claim 1, wherein,
 said power switching transistor comprises an NMOS-type power switching transistor, a drain of said NMOS-type power switching transistor is connected to said discharging resistor, a source of the power switching transistor is connected to a cathode of said DC-link capacitor, and a gate of the power switching transistor is connected to said first switch; and
 a terminal of the discharging resistor is connected to the anode of the DC-link capacitor, and the other terminal is connected to the drain of the power switch transistor, wherein the anode of the DC-link capacitor is connected to a positive voltage terminal of a bus of said power converting module, and the cathode of the DC-link capacitor is connected to a negative voltage terminal of said DC bus.

3. The active discharging module of an electric car of claim 1, wherein,
 said first switch comprises an NPN-type digital triode,
 wherein a collector of said NPN-type digital triode is connected to the anode of said DC-link capacitor and said power switching transistor respectively;
 an emitter of said NPN-type digital triode is connected to a negative voltage terminal of a DC bus of said power converting module; and
 a gate of said NPN-type digital triode is connected to said actuating apparatus.

4. The active discharging module of an electric car of claim 3, wherein,
 said active discharging module further comprises a triggering subcircuit which is used for triggering the turn-on of said power switching transistor, said triggering subcircuit comprises a voltage divider resistor and a diode which are connected in series;
 wherein one terminal of said voltage divider resistor is connected to the anode of said DC-link capacitor, and the other terminal is connected to a cathode of said diode and the collector of said NPN-type digital triode respectively; and
 an anode of said diode is connected to the negative voltage terminal of said DC bus.

5. The active discharging module of an electric car of claim 1, wherein said discharging subcircuit further comprises a first connector; and
 said first connector comprises a plurality of terminals connected in series: one of said terminals is connected to said discharging resistor, one of said terminals is connected to said power switching transistor, and one of said terminals is connected to the anode of said DC-link capacitor.

6. A driving apparatus of an electric car comprising a power converting module, wherein said driving apparatus comprises said active discharging module according to claim 1; said active discharging module is connected in between a positive voltage terminal and a negative voltage terminal of the DC bus of said power converting module;
 wherein said discharging subcircuit in said active discharging module is connected in parallel with a DC-link capacitor of said power converting module; and
 said first switch in said active discharging module is connected to an actuating apparatus of said power converting module.

7. The driving apparatus of an electric car of claim 6, wherein said driving apparatus further comprises a second switch; and
 wherein one terminal of said second switch is connected to the positive voltage terminal of said DC bus, the other terminal being connected to the anode of said DC-link capacitor, so as to implement the turn-on and turn-off between said DC-link capacitor and the positive voltage terminal of said DC bus; wherein the cathode of said DC-link capacitor is connected to the negative voltage terminal of said DC bus.

8. The driving apparatus of an electric car of claim 7, wherein said second switch in said driving apparatus comprises a contactor.

9. An electric drive system of an electric car, said electric drive system comprising an electric control apparatus, an electric motor, and a transmission apparatus, wherein said electric drive system comprises said driving apparatus according to claim 6;
 said power converting module in said driving apparatus is connected to said electric control apparatus and said electric motor respectively, so as to receive a power output instruction sent by said electric control apparatus, and driving said electric motor to put the transmission apparatus in action; wherein the transmission apparatus is used to drive a mechanical component of the electric car to be actuated; and the first switch of said active discharging module in said driving apparatus is connected to said electric control apparatus.

10. An electric car comprising a power battery, a power battery output interface, wherein said electric car comprises said electric drive system according to claim 9;
   wherein the power converting module of said driving apparatus in said electric drive system is connected to said power battery output interface, which is used for performing power conversion for a DC source output by said power battery.

11. The active discharging module of an electric car of claim 2, wherein,
   said first switch comprises an NPN-type digital triode,
   wherein a collector of said NPN-type digital triode is connected to the anode of said DC-link capacitor and said power switching transistor respectively;
   an emitter of said NPN-type digital triode is connected to a negative voltage terminal of the DC bus of said power converting module; and
   a gate of said NPN-type digital triode is connected to said actuating apparatus.

12. The active discharging module of an electric car of claim 2, wherein said discharging subcircuit further comprises a first connector; and
   said first connector comprises a plurality of terminals connected in series: one of said terminals is connected to said discharging resistor, one of said terminals is connected to said power switching transistor, and one of said terminals is connected to the anode of said DC-link capacitor.

13. The active discharging module of an electric car of claim 1, wherein said discharging subcircuit further comprises a first connector; and said first connector comprises a plurality of terminals connected in series: one of said terminals is connected to said discharging resistor, one of said terminals is connected to said power switching transistor, and one of said terminals is connected to the anode of said DC-link capacitor.

14. A driving apparatus of an electric car comprising a power converting module, wherein said driving module comprises said active discharging module according to claim 2;
   said active discharging module is connected in between a positive voltage terminal and a negative voltage terminal of the DC bus of said power converting module;
   wherein said discharging subcircuit in said active discharging module is connected in parallel with a DC-link capacitor of said power converting module; and
   said first switch in said active discharging module is connected to an actuating apparatus of said power converting module.

15. A driving apparatus of an electric car comprising a power converting module, wherein said driving module comprises said active discharging module according to claim 3;
   said active discharging module is connected in between a positive voltage terminal and a negative voltage terminal of the DC bus of said power converting module;
   wherein said discharging subcircuit in said active discharging module is connected in parallel with a DC-link capacitor of said power converting module; and
   said first switch in said active discharging module is connected to an actuating apparatus of said power converting module.

16. A driving apparatus of an electric car comprising a power converting module, wherein said driving module comprises said active discharging module according to claim 4;
   said active discharging module is connected in between a positive voltage terminal and a negative voltage terminal of the DC bus of said power converting module;
   wherein said discharging subcircuit in said active discharging module is connected in parallel with a DC-link capacitor of said power converting module; and
   said first switch in said active discharging module is connected to an actuating apparatus of said power converting module.

17. The driving apparatus of an electric car of claim 7, wherein said second switch in said driving apparatus comprises a contactor.

18. An electric drive system of an electric car, said electric drive system comprising an electric control apparatus, an electric motor, and a transmission apparatus, wherein said electric drive system comprises said driving apparatus according to claim 7;
   said power converting module in said driving apparatus is connected to said electric control apparatus and said electric motor respectively, which is used for receiving a power output instruction sent by said electric control apparatus, and driving said electric motor to put the transmission apparatus in action; wherein the transmission apparatus is used to drive a mechanical component of the electric car to be actuated; and
   the first switch of said active discharging module in said driving apparatus is connected to said electric control apparatus.

19. An electric drive system of an electric car, said electric drive system comprising an electric control apparatus, an electric motor, and a transmission apparatus, wherein said electric drive system comprises said driving apparatus according to claim 8;
   said power converting module in said driving apparatus is connected to said electric control apparatus and said electric motor respectively, which is used for receiving a power output instruction sent by said electric control apparatus, and driving said electric motor to put the transmission apparatus in action; wherein the transmission apparatus is used to drive a mechanical component of the electric car to be actuated; and
   the first switch of said active discharging module in said driving apparatus is connected to said electric control apparatus.

* * * * *